(12) United States Patent
Wilhelmsson

(10) Patent No.: US 10,257,840 B2
(45) Date of Patent: Apr. 9, 2019

(54) OPERATION OF WIRELESS LOCAL AREA NETWORK IN THE PRESENCE OF PERIODIC INTERFERENCE

(71) Applicant: Telefonaktiebolaget L M Ericsson (publ), Stockholm (SE)

(72) Inventor: Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 420 days.

(21) Appl. No.: 14/520,547

(22) Filed: Oct. 22, 2014

(65) Prior Publication Data

US 2016/0119935 A1  Apr. 28, 2016

(51) Int. Cl.
*H04W 72/08* (2009.01)
*H04W 72/12* (2009.01)
*H04W 28/02* (2009.01)
*H04W 16/14* (2009.01)
(Continued)

(52) U.S. Cl.
CPC ..... *H04W 72/082* (2013.01); *H04W 28/0205* (2013.01); *H04W 72/12* (2013.01); *H04W 72/1215* (2013.01); *H04W 16/14* (2013.01); *H04W 84/12* (2013.01); *H04W 88/10* (2013.01)

(58) Field of Classification Search
CPC ........... H04W 72/0453; H04W 72/082; H04W 84/12; H04W 72/046; H04W 88/06; H04W 16/14; H04W 16/28; H04B 17/345; H04B 7/024; H04B 7/0408; H04B 7/0632;
(Continued)

(56) References Cited

U.S. PATENT DOCUMENTS

| 7,070,812 B2 | 7/2006 | Runge et al. |
| 8,357,798 B2 | 1/2013 | Belyk et al. |
| 2005/0220106 A1 | 10/2005 | Raverdy et al. |

(Continued)

FOREIGN PATENT DOCUMENTS

| EP | 2 739 106 A2 | 6/2014 |
| WO | 03001742 A1 | 1/2003 |

(Continued)

OTHER PUBLICATIONS

PCT International Search Report, dated Jan. 7, 2016, in connection with International Application No. PCT/EP2015/074357, all pages.

(Continued)

*Primary Examiner* — Oussama Roudani
(74) *Attorney, Agent, or Firm* — Leffler Intellectual Property Law, PLLC; Kenneth B. Leffler

(57) ABSTRACT

A wireless access point device that schedules packet transmission and reception by devices (access point and stations) in a wireless local area network detects the presence of periodic transmissions on a first carrier frequency, wherein one or more of the detected periodic transmissions will interfere with reception of a packet by at least one of the devices. A different one of the devices is identified such that the detected periodic transmissions will not interfere with reception of a packet by the different one of the devices. Packet transmission and reception are scheduled within the wireless local area network such that said different one of the devices is scheduled to receive a packet during an occurrence of the detected periodic transmissions.

18 Claims, 8 Drawing Sheets

(51) Int. Cl.
*H04W 84/12* (2009.01)
*H04W 88/10* (2009.01)

(58) Field of Classification Search
CPC ... H04L 1/0001; H04L 1/1854; H04L 1/1861; H04L 1/1877
See application file for complete search history.

(56) References Cited

U.S. PATENT DOCUMENTS

| | | | |
|---|---|---|---|
| 2007/0171887 A1* | 7/2007 | Waxman | H04W 16/14 370/345 |
| 2007/0291913 A1* | 12/2007 | Trainin | H04L 12/66 379/93.08 |
| 2010/0197235 A1 | 8/2010 | Wilhelmsson | |
| 2010/0323711 A1* | 12/2010 | Damnjanovic | H04B 7/0617 455/450 |
| 2012/0170556 A1* | 7/2012 | Tsfati | H04W 72/1215 370/338 |
| 2013/0155931 A1 | 6/2013 | Prajapati et al. | |
| 2013/0196673 A1 | 8/2013 | Smadi et al. | |
| 2013/0272260 A1 | 10/2013 | Bitran et al. | |
| 2014/0169234 A1* | 6/2014 | Zhu | H04W 72/082 370/277 |
| 2015/0208253 A1* | 7/2015 | Kim | H04W 24/02 370/252 |
| 2015/0223243 A1* | 8/2015 | Tabet | H04W 28/085 370/330 |

FOREIGN PATENT DOCUMENTS

| | | |
|---|---|---|
| WO | 2012/088270 A1 | 6/2012 |
| WO | 2012093349 A2 | 7/2012 |
| WO | 2012/162788 A1 | 12/2012 |
| WO | 2013006988 A1 | 1/2013 |
| WO | 2013/149177 A2 | 10/2013 |
| WO | 2013/185279 A1 | 12/2013 |
| WO | 2014/064322 A1 | 5/2014 |
| WO | 20150172805 A1 | 11/2015 |

OTHER PUBLICATIONS

PCT Written Opinion, dated Jan. 7, 2016, in connection with International Application No. PCT/EP2015/074357, all pages.

Rich Kennedy, Ofcom Public Sector Spectrum Release (PSSR), Technical coexistence issues for the 2.3 and 3.4 GHz award, Piscataway, NJ, USA, vol. 802.18, May 13, 2014, 139 pages.

Kiminki, S. et al. "Coexistence-aware scheduling for LTE and WLAN during hard in-device interference" 2012 7th International ICST Conference on Cognitive Radio Oriented Wireless Networks and Communications (CROWNCOM), Jun. 2012, pp. 1-6.

Rathod, P. et al. "Facilitating Non-Collocated Coexistence for WiFi and 4G Wireless Networks" 37th Annual IEEE Conference on Local Computer Networks, Clearwater, Florida, 2012, pp. 1-9.

Oteri, O. et al. "Advanced power control techniques for interference mitigation in dense 802.11 networks" 2013 16th International Symposium on Wireless Personal Multimedia Communications, Jun. 24-27, 2013, IEEE, ISSN: 1347-6890, pp. 1-7.

Kishida, Akira et al. "A Novel Interference Avoidance Technique on Mobile Wireless Routers Using IEEE802.11n PSMP" IEICE Transactions Communications, vol. E93-B, No. 8, Aug. 2010, pp. 2053-2062.

Muqattash, A. et al. "A Single-Channel Solution for Transmission Power Control in Wireless Ad Hoc Networks" Proceedings of ACM MobiHoc, 2004, pp. 1-12.

PCT International Search Report, dated Jan. 13, 2016, in connection with International Application No. PCT/EP2015/074366, all pages.

PCT Written Opinion, dated Jan. 13, 2016, in connection with International Application No. PCT/EP2015/074366, all pages.

3GPP TSG-RAN WG2#72, R2-106476, Jacksonville, USA, Nov. 15-19, 2010, Motorola, Discussion on TDM approach for in-device coexistence, 2 pages.

* cited by examiner

OPERATION OF WIRELESS LOCAL AREA NETWORK IN THE PRESENCE OF PERIODIC INTERFERENCE

BACKGROUND

The invention relates to wireless communications, more particularly to wireless local area networks, and still more particularly to the operation of wireless local area networks in the presence of periodic interference.

Many portions of the radiofrequency spectrum are designated unlicensed bands, and these bands are presently widely used by wireless local area network (WLAN) technology. Because they are unlicensed, these bands are free for use by any device, so interference avoidance and/or tolerance are considerations in the design of such technology.

WLAN technology that complies with IEEE 802.11 standards is known as "Wi-Fi" technology. A Wi-Fi deployment involves a so-called access point (AP) to which some number of so-called "stations" (STA) can wirelessly connect. Wi-Fi technology operates in an unlicensed band, and the sharing of this spectrum is achieved by dividing the total bandwidth into a number of channels. The channels are typically 20 MHz wide in the 2.4 GHz band, where up to 13 channels are defined. These channels partially overlap one another, and thus will interfere with one another. Typically, three non-overlapping channels are used in the 2.4 GHz band. For the 5 GHz band, which has a much larger available bandwidth, many more channels are available. However, with the development of the IEEE 802.11n and IEEE 802.11ac standards, the bandwidth of the channels has been increased from 20 MHz to 40, 80, and even 160 MHz. Thus, the number of non-overlapping channels is still rather small, particularly when the wider bandwidths are used.

In typical WLAN deployments involving more than one AP, channels are allocated in a manner that attempts to avoid having one AP's channel overlap those of another. In practice, this often means that one tries to maximize the distance between APs using the same channel, so that the transmissions of one will not interfere with the transmissions of another. The strategy adopted for channel access is Carrier Sense Multiple Access with Collision Avoidance (CSMA/CA), in which the channel is first sensed to detect its possible use by one or more other transmitters. Transmission is initiated only if the sensing results in the channel being declared Idle. If the channel is instead declared Busy, the transmission is essentially deferred until the channel is found Idle.

When the range of several APs using the same frequency is sufficiently large, the coverage areas of the APs will overlap. Combined with the use of CSMA/CA, this means that all transmissions related to one AP will be deferred whenever a transmission on the same frequency to or from another AP that is within range is detected. Effectively, this means that if several APs are within range, they will have to share the channel in time, and the throughput for the individual APs may be severely degraded.

Cellular communication networks also employ wireless technology, and these have historically utilized licensed rather than unlicensed bands. However, discussions have recently started relating to the use of the unlicensed bands by one such network, the so-called Long Term Evolution (LTE) network that is standardized by the Third Generation Partnership Project (3GPP). One approach involves the LTE network operating on a best effort basis by using the unlicensed band as carrier aggregation of a secondary cell (SCell) while operating a Primary cell (PCell) in licensed spectrum. Thus, the network's connection to the device will still be maintained via at least the PCell even if interference by, for example, Wi-Fi or other technology (e.g., Bluetooth®) prevents communication on the SCell.

The present discussions are focusing on the SCell being used only for down-link (DL) communications, thus requiring the use of a PCell for up-link (UL) communications. However, it can be envisioned that, in the future, there may be LTE (or other) systems operating in the ISM band without the need for a simultaneous link in a licensed band. Such a system would most likely use time division duplex (TDD) to achieve shared usage of channels. Additionally, one of the more important goals in the evolvement of the IEEE 802.11 standard is to increase the spectrum efficiency in very dense deployments. This development work is done within the IEEE 802.11ax task group (TG). As one option for the 802.11ax standard, the use of a more scheduled approach has been discussed; that is, one in which channel access is controlled by the AP, rather than distributed. Thus, it is possible that there may be future 802.11-compliant technology whose operation is based on TDD.

In order to ease the description and avoid the use of the cumbersome generic terms "WLAN-type" and "LTE-type", as used herein the term "WLAN" is used generically to cover all types of ad hoc local area networking technology, such as and without limitation, Wi-Fi (i.e., IEEE 802.11 compatible) technology and Bluetooth® (i.e., Bluetooth SIG-defined) technology. Similarly, references to LTE should be construed broadly to cover any type of other network having relevant characteristics similar to the proposed LTE systems described herein (e.g., the use of the unlicensed band without conforming to WLAN standards for ad hoc local area networking, and transmissions having a predictable periodic nature).

The inventor has recognized that the situation involving concurrent use of the unlicensed band by different types of systems (e.g., concurrently by WLAN and LTE systems) can cause problems for the WLAN system. For example, if another system, (e.g. an LTE system as defined by 3GPP standards) is used in the same band as the WLAN network, this use may severely degrade performance within the WLAN network if no counteraction is taken. In particular, because of the CSMA/CA mechanism, the WLAN system may defer a transmission upon sensing that the spectrum is Busy, and this may happen even if the signal quality (e.g., the signal-to-interference-ratio (SIR)) for performing the transmission would have been sufficient to allow that transmission to be successful. In addition, there is a high likelihood that an ongoing WLAN transmission will experience interference from an LTE transmission because the channel access in WLAN is typically based on distributed access, (e.g., using the distributed coordination function (DCF), which is a mechanism whereby each potential user of the spectrum that is presently sensed as "Busy" applies an algorithm to decide how long to defer its next transmission attempt).

In scenarios in which an LTE (TDD) node operates on the same or adjacent channel to one used by a WLAN deployment, the LTE transmission may cause severe interference for the WLAN system. The LTE interference may cause problems for both the AP (i.e., for the UL transmission) and the STA (i.e., for the DL transmission). The severity of interference that any AP or STA will experience depends, in part, on the distance from the LTE transmitter and in part on the output power used by that transmitter. It is noted that any link in LTE (i.e., either DL or UL) may interfere with any of the WLAN links (either DL or UL). Accordingly, as used in this discussion, "LTE transmitter" may refer either to the network node (e.g., eNB) or to a user equipment (UE). As discussed initially, there may be a situation in which only DL transmissions are performed in the unlicensed band as a secondary carrier, whereas all UL transmissions take place in a licensed band. In this case, it is of course only the LTE DL transmission (i.e., transmissions from the eNB) that can cause interference that disturbs the WLAN links.

The power level of the received interfering signal relative to the power level of the received desired signal (i.e., the signal from the AP or one of the stations) will determine whether the interference level will be high enough to cause an issue. Another factor that affects whether the WLAN deployment will experience interference is the level of activity of the interfering transmitter. If, for example, it is an eNB that is interfering, it can be expected that the amount of activity will be very high because the eNB transmits downlink data to many UEs within its serving area. On the other hand, if it is only one UE that is causing the interference and the UE has very low activity, the interference may only be present for a small fraction of the total time.

It is therefore desired to have technology that can mitigate or avoid the potential degradation of WLAN performance that can result from periodic interference such as, but not limited to, interference from an LTE TDD system operating in the same band as the WLAN deployment.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof. Also, as used herein the term "exemplary" means serving as one illustration out of any number of possible illustrations.

In accordance with one aspect of the present invention, the foregoing and other objects are achieved in technology that operates a wireless access point device that schedules packet transmission and reception by a set of devices in a wireless local area network, wherein the set of devices includes the access point device and one or more other devices. Such operation includes the wireless access point device detecting the presence of periodic transmissions on a first carrier frequency from a first transmitter, wherein one or more future occurrences of the periodic transmissions will interfere with reception of a packet by a first device of the set of devices. A second device of the set of devices is identified such that the one or more future occurrences of the periodic transmissions will not interfere with reception of a packet by the second device. Packet transmission and reception within the wireless local area network are scheduled such that the second device is scheduled to receive a packet during an occurrence of the one or more future occurrences of the periodic transmissions.

In some but not necessarily all embodiments, detecting the presence of the periodic transmissions on the first carrier frequency involves the wireless access point sensing the periodic transmissions on the first carrier frequency. In some alternative embodiments, detecting the presence of the periodic transmissions on the first carrier frequency comprises receiving one or more reports from one or more of the one or more other devices, wherein the reports comprise information about the periodic transmissions on the first carrier frequency. In some but not necessarily all of such embodiments, at least one of the reports comprises information about a received power level of the periodic transmissions on the first carrier frequency.

In some but not necessarily all embodiments, the first transmitter is a transmitter operating in a cellular communication system, and the periodic transmissions on the first carrier frequency are time division duplex transmissions of the first transmitter.

In some but not necessarily all embodiments, scheduling packet transmission and reception within the wireless local area network such that the second device is scheduled to receive the packet during an occurrence of the one or more future occurrences of the periodic transmissions comprises adjusting an air interface frame structure of the wireless local area network such that the second device is scheduled to receive the packet during the occurrence of the one or more future occurrences of the periodic transmissions. In some but not necessarily all embodiments, adjusting the air interface frame structure of the wireless local area network comprises changing a periodicity of the air interface frame structure of the wireless local area network.

In some but not necessarily all embodiments, scheduling packet transmission and reception within the wireless local area network such that the second device is scheduled to receive the packet during an occurrence of the one or more future occurrences of the periodic transmissions comprises adjusting an air interface frame structure of the wireless local area network such that the second device is scheduled to receive the packet during an occurrence of the one or more future occurrences of the periodic transmissions and to transmit another packet during a nonoccurrence of the one or more future occurrences of the periodic transmissions. In some but not necessarily all of such embodiments, the first transmitter operates in a cellular communication system; the occurrence of the one or more future occurrences of the periodic transmissions is an occurrence of a transmission of the first transmitter; and the nonoccurrence of the one or more future occurrences of the periodic transmission is an occurrence of a transmission of a second transmitter operating in the cellular communication system.

In some but not necessarily all embodiments, operating the wireless access point device includes identifying a third device of the set of devices such that the one or more future occurrences of the periodic transmissions will not interfere with reception of a packet by the third device. Packet transmission and reception within the wireless local area network are then scheduled such that the third device is scheduled to receive a packet at the same time that the second device is scheduled to receive a packet.

BRIEF DESCRIPTION OF THE DRAWINGS

The objects and advantages of the invention will be understood by reading the following detailed description in conjunction with the drawings in which.

DETAILED DESCRIPTION

Figure 1:
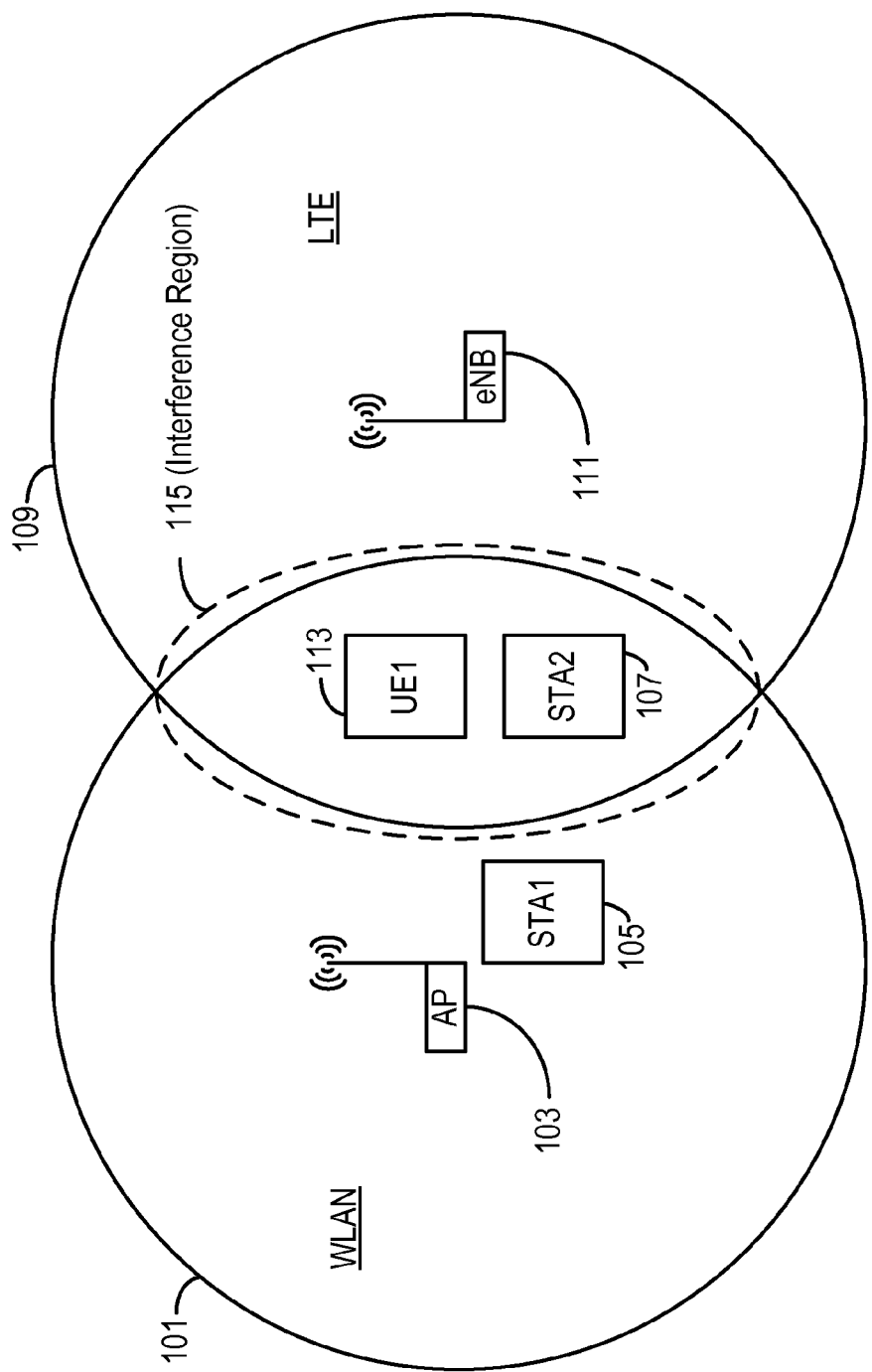
FIG. 1 illustrates an exemplary WLAN deployment having a WLAN coverage area that is controlled by an AP.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of non-transitory computer/processor readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

A number of embodiments are described that address, among other things, the problem of mitigating or avoiding the potential degradation of WLAN performance that can result from periodic interference occurring in the same band as the WLAN deployment. As will be seen in greater detail, an aspect involves the WLAN deployment employing scheduling so that, when an interfering periodic transmission is occurring, transmissions are directed to one or more particular WLAN devices that are less affected by the interfering periodic transmission.

In another aspect, scheduling is employed so that, when an interfering periodic transmission is not occurring, transmissions are directed to one or more particular WLAN devices that would otherwise experience a higher degradation of performance from the interfering periodic transmission.

In yet another aspect, scheduling can protect at least one of a WLAN device's links (i.e., UL and/or DL) from degraded performance due to occurrence of the periodic interfering transmission.

These and other aspects are described in further detail in the following.

Embodiments consistent with the invention rely on the interference pattern from the LTE deployment having a time-wise predictable nature, and on the various devices within the WLAN deployment being differently affected by the periodic interfering transmissions (e.g., the different STAs in the WLAN deployment may be very differently affected by the various UL and DL transmissions of the LTE TDD system).

The reader is reminded that, to facilitate the use of recognizable terminology, the description of the following exemplary embodiments assumes that the periodic interference is due the operation of a 3GPP LTE TDD system. However, the principles underlying these specific examples are applicable to periodic interference in general, and examples employing TDD can be seen as a special case in which the period of the interference corresponds to the frame duration in LTE and in which the on-time of the interference corresponds to the DL transmission in LTE (i.e., the transmission from the eNB to the UE). Unless otherwise stated, it is assumed that knowledge about the interference pattern has been obtained by the WLAN deployment. This can be done by any of a number of ways, such as, without limitation, by means of signaling between the WLAN deployment and the interfering system, by direct measurements performed by some or all involved units within the WLAN deployment, by indirect measurements performed by the WLAN deployment (e.g., based on error statistics detected within the WLAN deployment). Whether any of these illustrated ways or some other way is used is irrelevant to practicing the invention, since the same underlying principles are applicable in all cases.

FIG. 1 illustrates a WLAN deployment having a WLAN coverage area 101 that is controlled by an AP 103. In this example, the AP 103 communicates with a first station 105 and a second station 107. The functionality of the AP 103 is different from that of the other devices (in this example, the first and second stations 105, 107) in that it serves as the stations' gateway to a data network, and in some cases can take a controlling role with respect to communications within the WLAN. But all are devices of some type and all engage in wireless communication in one or more unlicensed bands. Consequently, the AP 103 and the first and second stations 103, 105 together constitute a set of devices in this exemplary WLAN deployment. It will be understood that other deployments would still have an AP, but could have a different number of stations. The WLAN deployment is nearby an LTE coverage area 109 that is served by an eNB 111 operating in the same unlicensed band as the AP 103, both in the UL and the DL directions. The figure is not drawn to scale with respect to the relative sizes of the WLAN coverage area 101 and the size of the LTE coverage area 109. In practice, the size of the LTE coverage area 109 would ordinarily be larger than the size of the WLAN coverage area but the size of the WLAN coverage area 101 relative to that of the LTE coverage area 109 is not of much importance to embodiments consistent with the invention.

For purposes of illustration, a UE 113 served by the eNB 111 is shown. It will be understood that the eNB 111 may additionally be serving other UEs (not shown).

In this example the WLAN coverage area 101 and the LTE coverage area 109 partially overlap, creating the possibility of the second station 107 and the UE 113 being near one another, each communicating with its respective system. The UE's UL transmissions, being in the unlicensed band, create an interference region 115 (shown in dashed lines for clarity), and it is in this interference region 115 that the second station 107 is located. The first station 103 is not so situated, and is instead outside of the interference region 115, very close to the AP 103 (which is also outside of the interference region 115).

As a result of its proximity to the AP 103, the carrier-to-interference ratio (C/I) of the AP's signals received by the first station 105 is high in the presence of both UL and DL transmissions within the LTE coverage area. Consequently, it does not suffer seriously degraded performance due to interference from the LTE system's transmissions.

Figure 2:
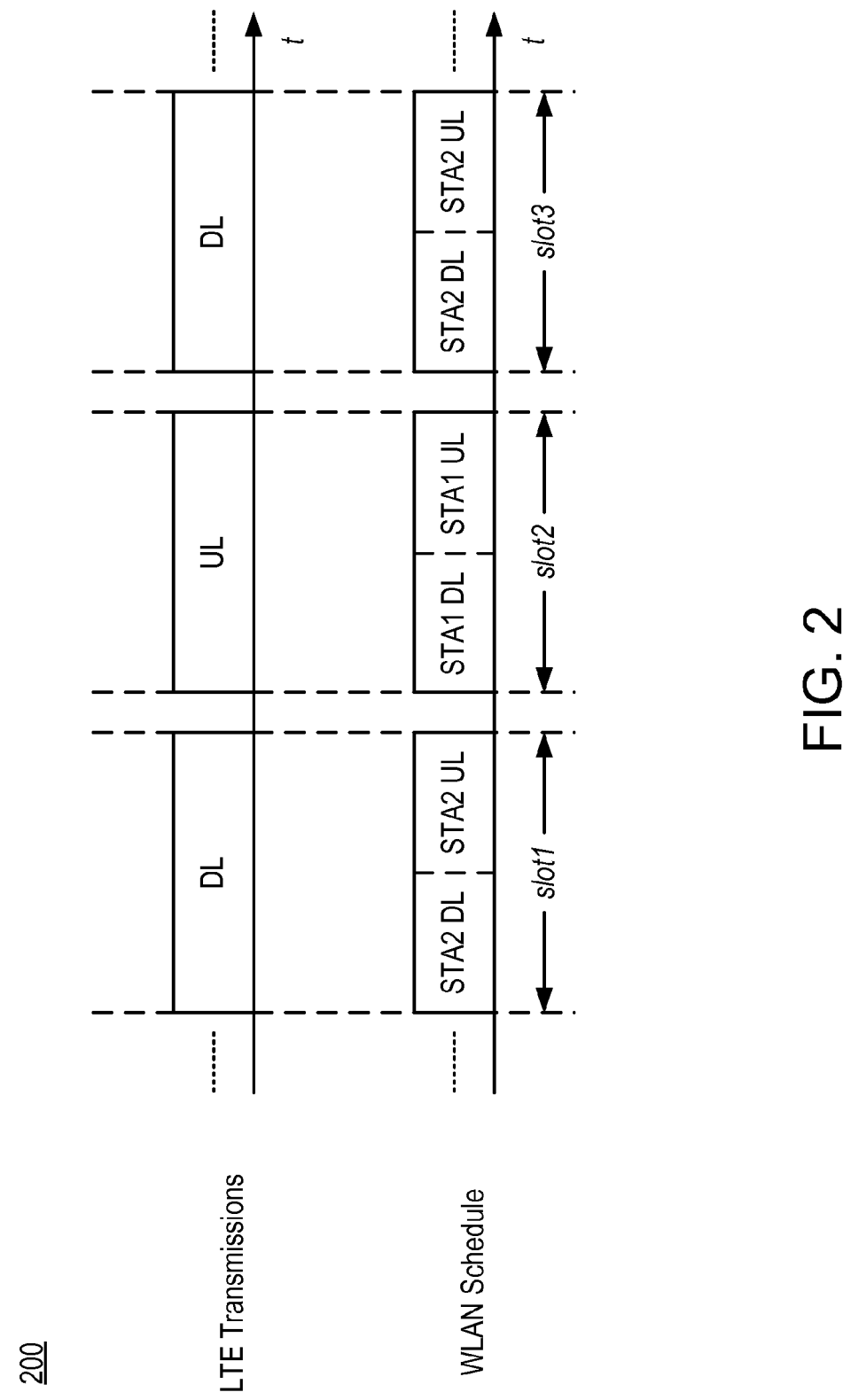
FIG. 2 is a scheduling diagram showing an exemplary interference mitigating schedule in accordance with an aspect of the invention.

By contrast, the second station's proximity to the UE 113 makes it susceptible to severe interference by the UE's UL transmissions. Accordingly, scheduling of reception within the WLAN deployment in this exemplary embodiment is configured to take into account this periodic interference potential. FIG. 2 is a scheduling diagram showing the resultant interference mitigating schedule 200. Three slots are shown: slot1, slot2, and slot3. In the LTE system, the eNB 111 engages in DL transmissions during slot1 and slot3, whereas the UE1 113 engages in an UL transmission during slot2. It will be observed that the LTE system's UL transmissions are periodic, as are its DL transmissions. This means that the times during which future UL and/or DL transmissions will occur is predictable.

Knowing that the UE's UL transmission during slot2 would interfere with STA2's ability to receive a packet from the AP 103, the WLAN deployment creates a schedule that enables STA1 105 to receive a packet during slot2. As mentioned above, the C/I between the AP 103 and STA1 105 is very high, so the UE1's transmissions during slot2 will not seriously degrade the STA1's reception of the AP's signal, if at all. This leaves slot1 and slot3, during which the schedule calls for STA2 to perform its packet receptions. It is assumed here that the eNB's DL transmissions during these slots will not interfere with the STA2's reception of AP's signals, or at least not to the extent that successful reception cannot be performed.

Further in this example, the ability of the AP 103 to receive packets from STA1 105 and STA2 107 is not hampered by DL transmissions from the eNB 111, so no special adaptations need to be made to the WLAN schedule to account for this.

Figure 3:
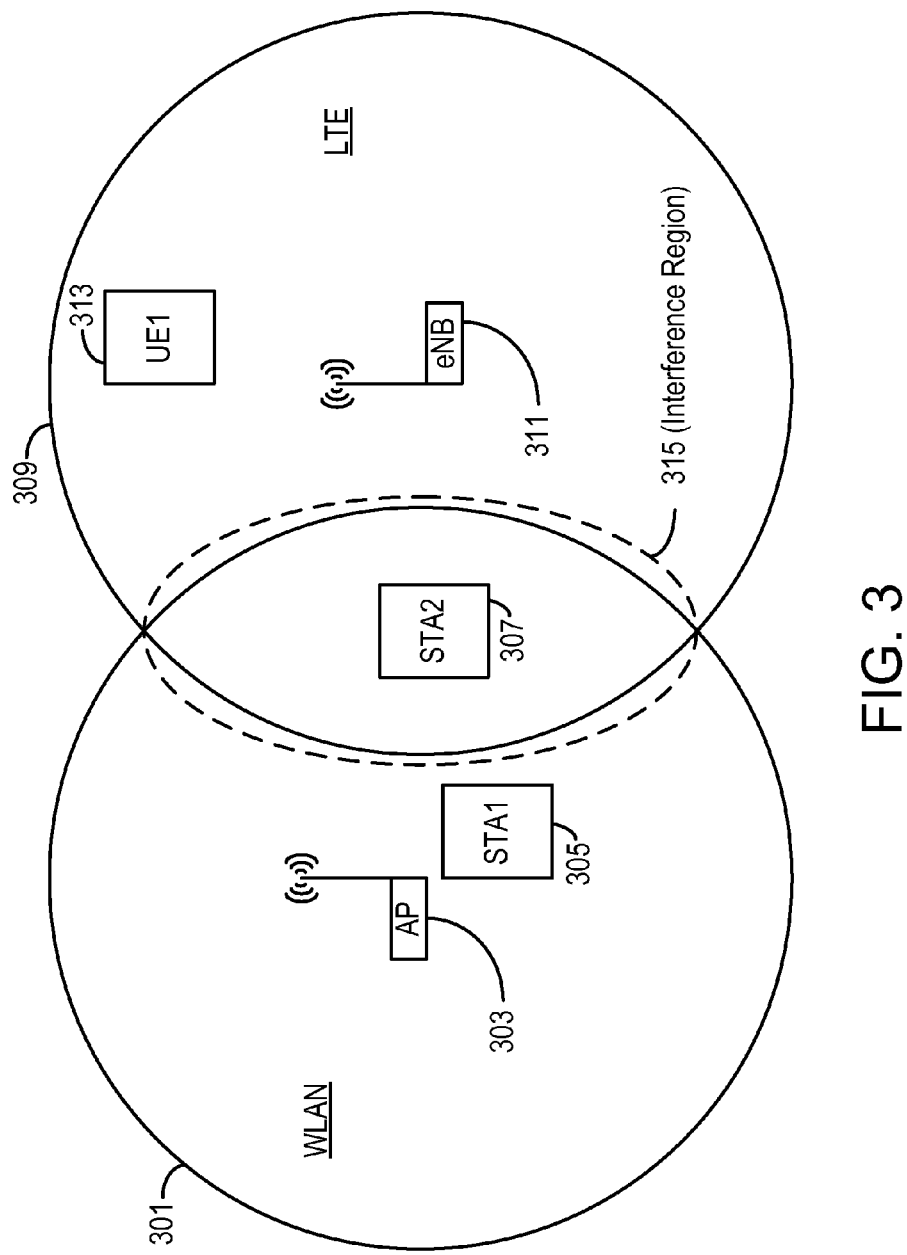
FIG. 3 illustrates another exemplary WLAN deployment having a WLAN coverage area that is controlled by an AP.

FIG. 3 illustrates another exemplary WLAN deployment, this one having a WLAN coverage area 301 that is controlled by an AP 303. In this example, the AP 303 communicates with a first station 305 and a second station 307. The functionality of the AP 303 is different from that of the other devices (in this example, the first and second stations 305, 307) in that it serves as the stations' gateway to a data network, and in some cases can take a controlling role with respect to communications within the WLAN. But all are devices of some type and all engage in wireless communication in one or more unlicensed bands. Consequently, the AP 303 and the first and second stations 303, 305 together constitute a set of devices in this exemplary WLAN deployment. It will be understood that other deployments would still have an AP, but could have a different number of stations. The WLAN deployment is nearby an LTE coverage area 309 that is served by an eNB 311 operating in the same unlicensed band as the AP 303, both in the UL and the DL directions. The figure is not drawn to scale with respect to the relative sizes of the WLAN coverage area 301 and the size of the LTE coverage area 309. In practice, the size of the LTE coverage area 309 would ordinarily be larger than the size of the WLAN coverage area 301.

For purposes of illustration, a UE 313 served by the eNB 311 is shown. It will be understood that the eNB 311 may additionally be serving other UEs (not shown).

In this example the WLAN coverage area 301 and the LTE coverage area 309 partially overlap, so that any device operating within this region would be within range of both the AP 303 and the eNB 311. The eNB's DL transmissions, being in the unlicensed band, therefore create an interference region 315 (shown in dashed lines for clarity), and it is in this interference region 315 that the second station 307 is located. The first station 305 is not so situated, and is instead outside of the interference region 315, very close to the AP 303 (which is also outside of the interference region 315). The UE1 313 is far from any of the devices of the WLAN deployment, so its UL transmissions will not cause any interference in that system.

As a result of its proximity to the AP 303, the carrier-to-interference ratio (C/I) of the AP's signals received by the first station 305 is high in the presence of both UL and DL transmissions within the LTE coverage area. Consequently, it does not suffer seriously degraded performance due to interference from the LTE system's transmissions.

Figure 4:
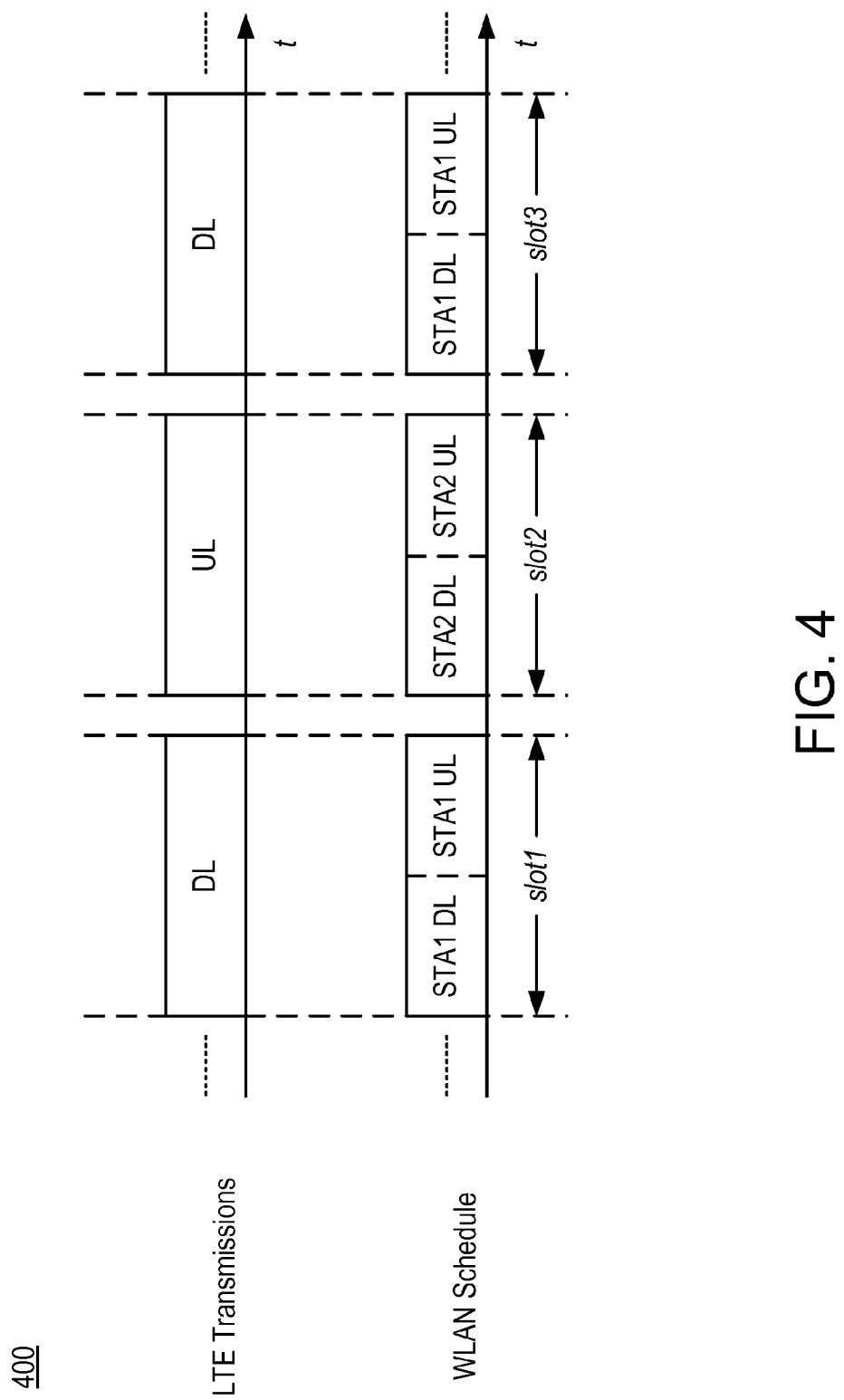
FIG. 4 is a scheduling diagram showing another exemplary interference mitigating schedule in accordance with an aspect of the invention.

By contrast, the second station's proximity to the eNB 311 makes it susceptible to severe interference by the eNB's DL transmissions. Accordingly, scheduling of reception within the WLAN deployment in this exemplary embodiment is configured to take into account this periodic interference potential. FIG. 4 is a scheduling diagram showing the resultant interference mitigating schedule 400. Three slots are shown: slot1, slot2, and slot3. It will be observed that the LTE system's UL transmissions are periodic, as are its DL transmissions. This means that the times during which future UL and/or DL transmissions will occur is predictable. In the LTE system, the eNB 311 engages in DL transmissions during slot1 and slot3, whereas the UE1 313 engages in an UL transmission during slot2. Knowing that the eNB's DL transmissions during slot1 and slot3 would interfere with STA2's ability to receive a packet from the AP 303, the WLAN deployment creates a schedule that enables STA1 305 to receive a packet during slot1 and during slot3. This leaves slot2, during which the schedule calls for STA1 to perform its packet reception.

Further in this example, the ability of the AP 303 to receive packets from STA1 305 and STA2 307 is not hampered by DL transmissions from the eNB 311, so no special adaptations need to be made to the WLAN schedule to account for this.

It can be seen that the exemplary interference mitigating schedule 400 is the opposite of the earlier-described exemplary interference mitigating schedule 200, this being because of the differing interference situations between the two exemplary deployments.

In the above-described examples, the focus was on mitigating interference experienced by one or more stations in a WLAN deployment. Aspects of embodiments consistent with the invention are not limited to this, however, and can be applied when the AP itself would suffer a performance degradation due to periodic transmissions from another system. An interesting example involves a situation in which it is desired to mitigate periodic interference experienced not only by the AP, but additionally by one or more of the stations in the WLAN deployment (i.e., any one of the devices in the WLAN deployment). This case is handled by making a distinction between the UL and the DL such that a device's DL operation is scheduled to occur when there is one interference level, and its UL operation is scheduled to occur when there is another level.

Figure 5:
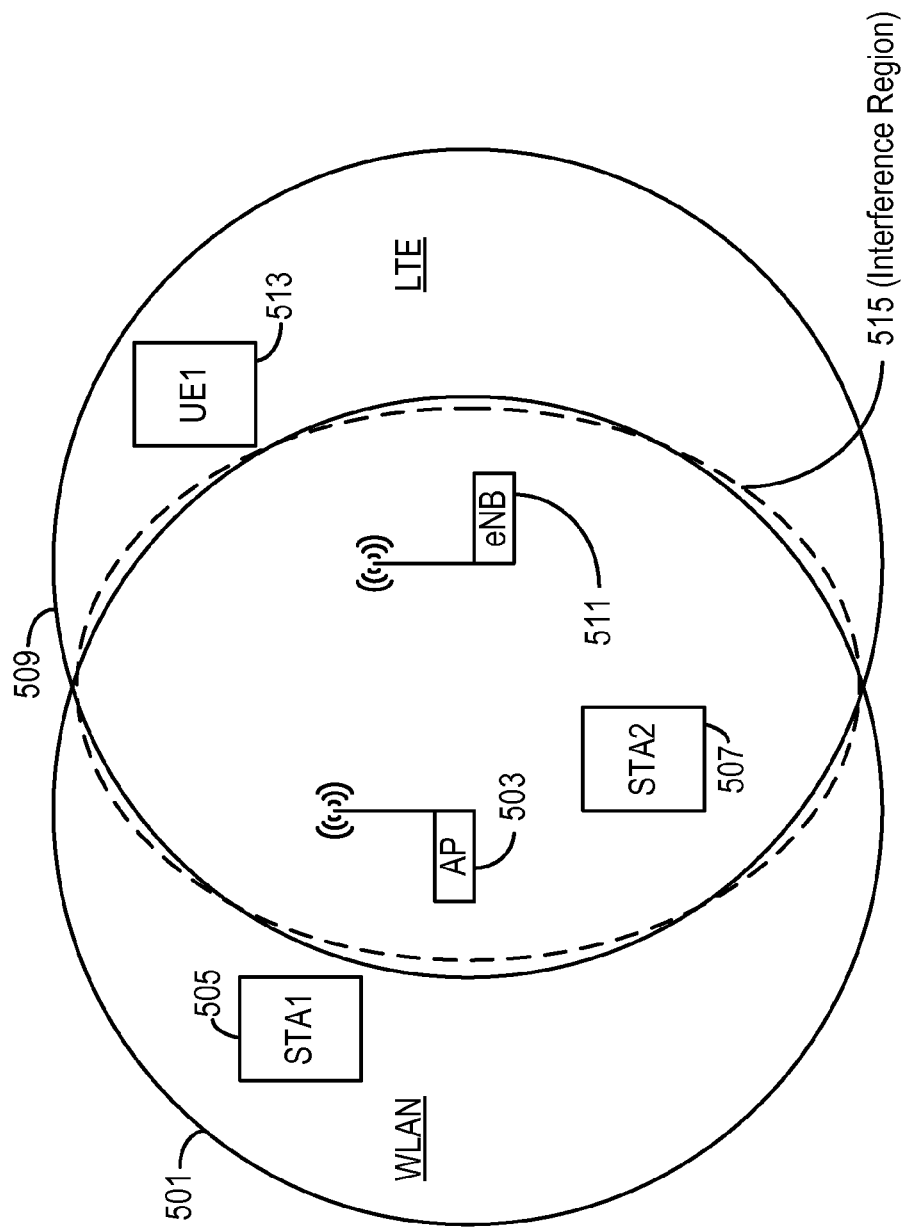
FIG. 5 illustrates another exemplary WLAN deployment having a WLAN coverage area that is controlled by an AP.

To illustrate this aspect of embodiments consistent with the invention, FIG. 5 illustrates another exemplary WLAN deployment, this one having a WLAN coverage area 501 that is controlled by an AP 503. In this example, the AP 503 communicates with a first station 505 and a second station 507. The functionality of the AP 503 is different from that of the other devices (in this example, the first and second stations 505, 507) in that it serves as the stations' gateway to a data network, and in some cases can take a controlling role with respect to communications within the WLAN. But all are devices of some type and all engage in wireless communication in one or more unlicensed bands. Consequently, the AP 503 and the first and second stations 503, 505 together constitute a set of devices in this exemplary WLAN deployment. It will be understood that other deployments would still have an AP, but could have a different number of stations. The WLAN deployment is nearby an LTE coverage area 509 that is served by an eNB 511 operating in the same unlicensed band as the AP 503, both in the UL and the DL directions. The figure is not drawn to scale with respect to the relative sizes of the WLAN coverage area 501 and the size of the LTE coverage area 509. In practice, the size of the LTE coverage area 509 would ordinarily be larger than the size of the WLAN coverage area 501.

For purposes of illustration, a UE 513 served by the eNB 511 is shown. It will be understood that the eNB 511 may additionally be serving other UEs (not shown).

In this example the WLAN coverage area 501 and the LTE coverage area 509 partially overlap, so that any device operating within this region would be within range of both the AP 503 and the eNB 511. The eNB's DL transmissions, being in the unlicensed band, therefore create an interference region 515 (shown in dashed lines for clarity). Of note in this example is the presence of both the AP 503 and the second station 507 within the interference region 515. The first station 505 is not so situated, and is instead outside of the interference region 515. The UE1 513 is far from any of the devices of the WLAN deployment, so its UL transmissions will not cause any interference in that system.

In this example, the DL transmission from the AP 503 to the first station 505 will not be disrupted by interference from either the UL of DL transmissions of the eNB 511, this being because the first station 505 is sufficiently far away from the transmitters in the LTE system. However, with respect to the first station's UL transmissions directed to the AP 503, the eNB's DL transmissions may cause reception problems because the eNB 511 is relatively close to the AP 503.

Figure 6:
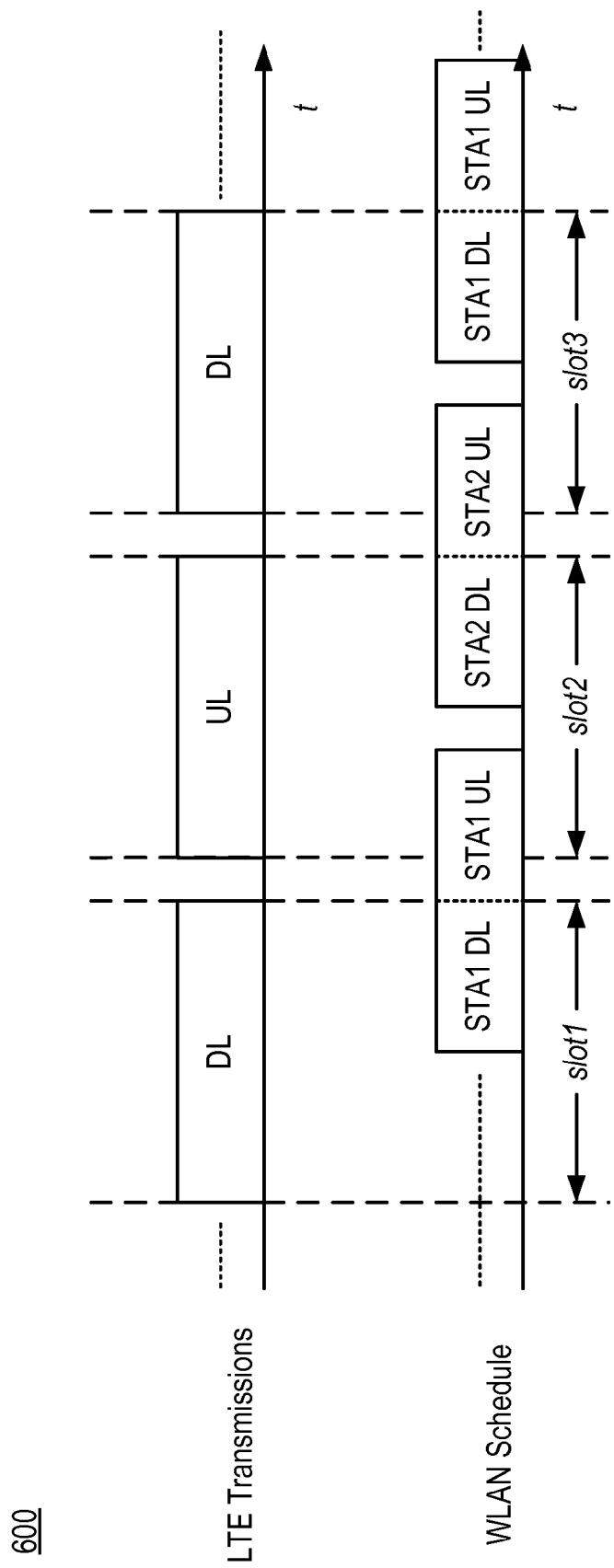
FIG. 6 is another scheduling diagram showing an exemplary interference mitigating schedule in accordance with an aspect of the invention.

Accordingly, scheduling of reception and transmission within the WLAN deployment in this exemplary embodiment is configured to take into account this periodic interference potential. FIG. 6 is a scheduling diagram showing the resultant interference mitigating schedule 600. Three slots are shown: slot1, slot2, and slot3. It will be observed that the LTE system's UL transmissions are periodic, as are its DL transmissions. This means that the times during which future UL and/or DL transmissions will occur is predictable. In the LTE system, the eNB 511 engages in DL transmissions during slot1 and slot3, whereas the UE1 513 engages in an UL transmission during slot2. Knowing that the eNB's DL transmissions during slot1 and slot3 would interfere with the AP's ability to receive a packet from the first station 505, and also that the eNB's DL transmissions during slot1 and slot3 would interfere with the second station's ability to receive a downlink packet from the AP 503, the WLAN deployment creates a schedule that enables the AP 503 to receive the first station's UL transmission and for the second station 507 to receive the AP's DL transmission, both during slot2. This leaves slot1 and slot3, during which the schedule calls for the AP 503 to receive the UL transmission from the second station 507 and for the first station 503 to receive the DL transmission from the AP 503. Looking at the scheduling of any one of the devices susceptible to the periodic interference (i.e., in this example, any one of the AP 503 and the second station 507), it can be seen that it is scheduled to receive a packet during an occurrence of the periodic transmission, and to transmit another packet during a nonoccurrence of the periodic transmission. In this way, the operation of each device in the WLAN deployment is scheduled to straddle the UL and DL slots of the LTE system.

It is noted that, in this example, the ability of the AP 503 to receive packets from the second station 507 is not hampered by the eNB's DL transmission because the AP 503 and second station 507 are relatively close to one another, and hence have a relatively high C/I. Consequently, no special adaptations need to be made to the WLAN schedule to account for these transmissions.

In the above embodiments, the stations were scheduled on an individual basis. In yet further alternatives, stations can be divided into groups of stations, with for example one group being scheduled to send/receive during one time interval corresponding to UL traffic in LTE, and with another group being scheduled to send/receive during a second time interval corresponding to DL traffic in LTE.

This strategy can be adopted when, for example, the WLAN system is utilizing Orthogonal Frequency Division Multiple Access (OFDMA) transmissions, or if it is employing multi-user Multiple Input Multiple Output (MU-MIMO), so that transmission can be performed to several receivers simultaneously. If OFDMA or MU-MIMO are being used only in the DL, then the approach would simply be to just group devices together with respect to DL transmissions.

Another example of when grouping of stations can be used is when CSMA/CA is still used, rather than scheduling by the AP. In this case, the different stations are grouped such that one set of stations is allowed to perform CSMA/CA during the UL frames of LTE, whereas the other group of stations is allowed to perform CSMA/CA during the DL frames of LTE.

Figure 7:
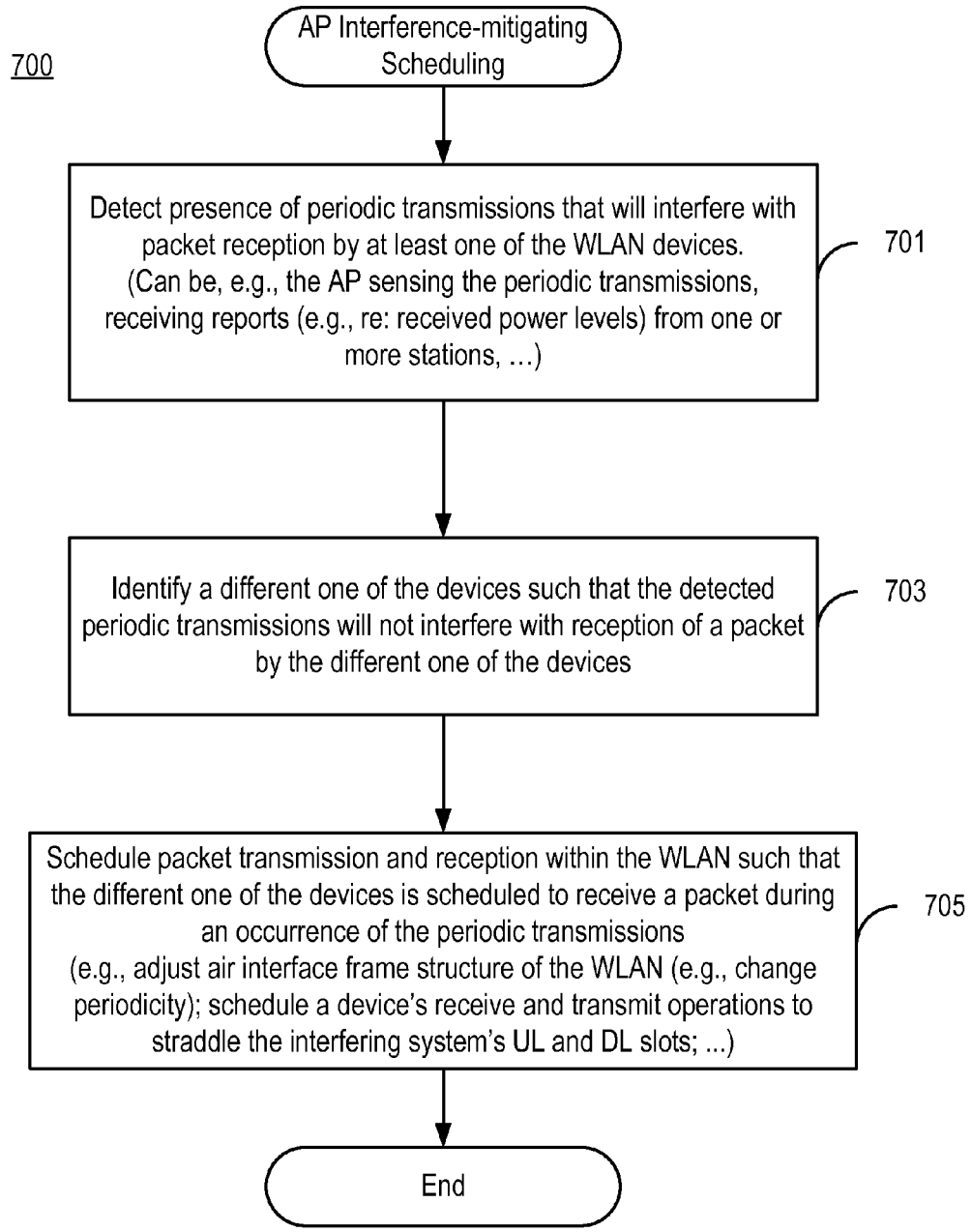
FIG. 7 is, in one respect, a flow chart of steps/processes performed by circuitry in accordance with some but not necessarily all exemplary embodiments of the invention.

To further illustrate aspects of embodiments consistent with the invention, FIG. 7 is, in one respect, a flow chart of steps/processes performed by circuitry in accordance with some but not necessarily all exemplary embodiments of the invention. In another respect, FIG. 7 can be considered to depict exemplary means 700 comprising the various illustrated circuitry (e.g., hard-wired and/or suitably programmed processor) configured to perform the described functions.

As shown in FIG. 7, an exemplary embodiment involves operation of a wireless access point device that schedules packet transmission and reception by a set of devices in a wireless local area network. Consistent with an earlier part of this description, the term "set of devices" includes the access point device and one or more other devices.

The access point scheduling operation involves detecting the presence of periodic transmissions on a first carrier frequency, wherein one or more future occurrences of the periodic transmissions will interfere with reception of a packet by a first device of the set of devices (i.e., by the AP and/or one or more of the stations) (step 701). This can be performed in any number of ways such as, without limitation:

the wireless access point sensing the periodic transmissions on the first carrier frequency the wireless access point receiving one or more reports from one or more other devices in the wireless local area network, wherein the reports comprise information about the periodic transmissions on the first carrier frequency (e.g., information about a received power level of the periodic transmissions).

Further, a different one of the devices is identified such that the one or more future occurrences of the detected periodic transmissions will not interfere with reception of a packet by the different one ("second device") of the devices (step 703).

Packet transmission and reception are then scheduled within the WLAN such that the identified second device is scheduled to receive a packet during a future occurrence of the detected periodic transmissions (step 705). As one example, this scheduling can involve adjusting (e.g., changing the periodicity of) an air interface frame structure of the wireless local area network such that the second device is scheduled to receive the packet during an occurrence of the one or more future occurrences of the periodic transmissions. As another example, the air interface frame structure of the WLAN is adjusted such that the second device is scheduled to receive the packet during a future occurrence of the periodic transmissions and to transmit another packet during a nonoccurrence of the one or more future occurrences of the periodic transmissions.

Figure 8:
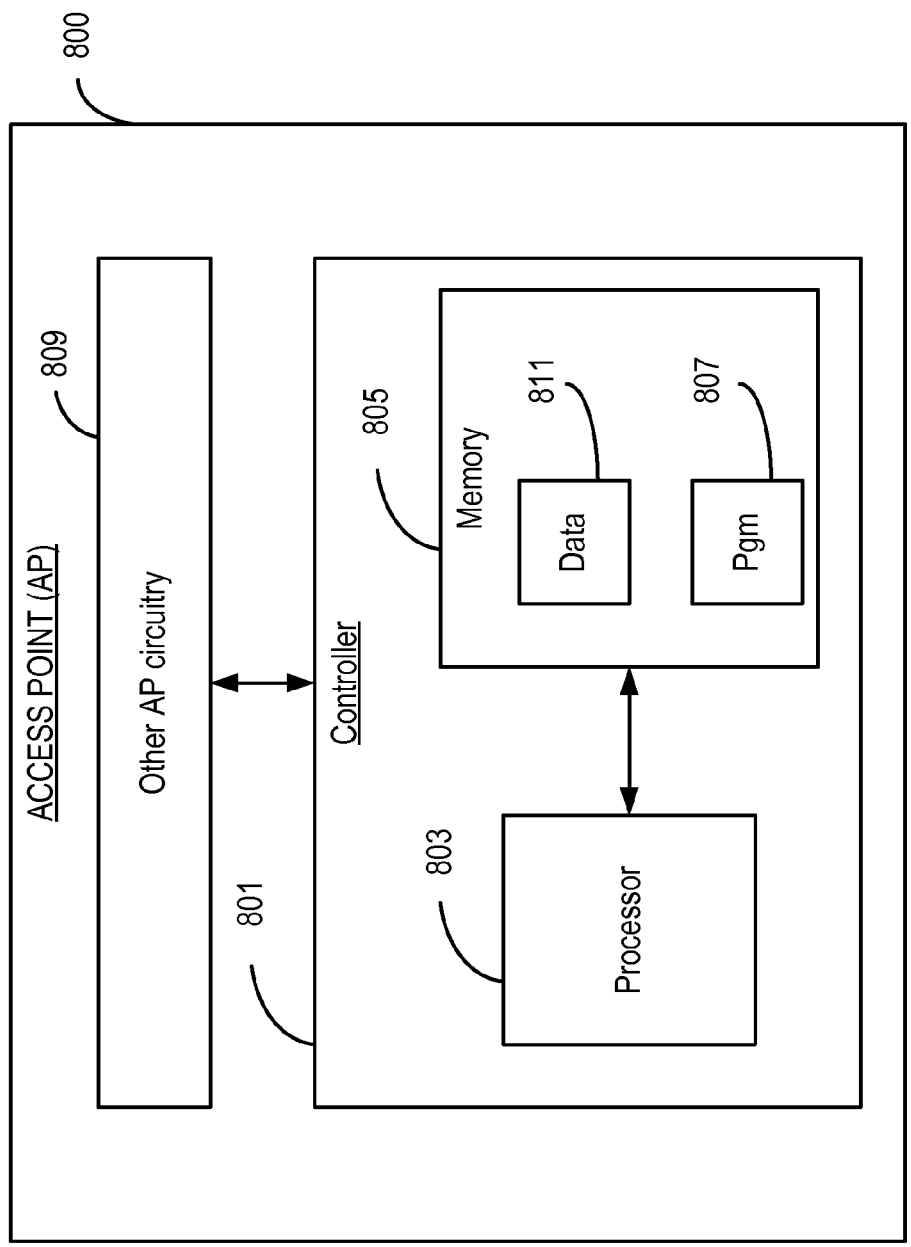
FIG. 8 is a block diagram of an exemplary access point of a WLAN.

FIG. 8 is a block diagram of an exemplary access point 800 of a WLAN wherein the access point 800 comprises a controller 801 that is circuitry configured to carry out, in addition to typical AP functionality, any one or any combination of the aspects described in connection with any one or combination of FIGS. 1 through 7 above. Such circuitry could, for example, be entirely hard-wired circuitry (e.g., one or more ASICs). Depicted in the exemplary embodiment of FIG. 8, however, is programmable circuitry, comprising a processor 803 coupled to one or more memory devices 805 (e.g., Random Access Memory, Magnetic Disc Drives, Optical Disk Drives, Read Only Memory, etc.). The memory device(s) 805 store program means 807 (e.g., a set of processor instructions) configured to cause the processor 803 to control other node circuitry/hardware components 809 so as to carry out any of the functions described above. The memory 805 may also store data 811 representing various constant and variable parameters as may be received, generated, and/or otherwise needed by the processor 803 when carrying out its functions such as those specified by the program means 807.

At least some embodiments consistent with aspects of the invention prove advantageous over conventional technology by reducing the impact of interference, and by that improving performance in terms of spectrum efficiency, power consumption, and the like. The principles involved may or may not have a direct impact on the interfering system, but this is not seen as a significant drawback because any system operating in unlicensed bands should be able to adapt to dynamically changing interference conditions.

The invention has been described with reference to particular embodiments. However, it will be readily apparent to those skilled in the art that it is possible to embody the invention in specific forms other than those of the embodiment described above.

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a wireless access point device that schedules packet transmission and reception by a set of devices in a wireless local area network, wherein the set of devices includes the access point device and two or more other devices, the method comprising:

the wireless access point device performing:
detecting the presence of periodic transmissions on an interfering portion of a frequency band from a first transmitter, wherein one or more future occurrences of the periodic transmissions will interfere with reception of a packet by a first device of the set of devices in the wireless local area network;
identifying a second device of the set of devices in the wireless local area network such that the one or more future occurrences of the periodic transmissions will not interfere with reception of a packet on the interfering portion of the frequency band by the second device; and
scheduling packet transmission and reception within the wireless local area network such that the second device is scheduled to receive a packet on the interfering portion of the frequency band during an occurrence of the one or more future occurrences of the periodic transmissions, wherein:
the first transmitter is a transmitter operating in a cellular communication system; and
the periodic transmissions on the interfering portion of the frequency band are time division duplex transmissions of the first transmitter.

2. The method of claim 1, wherein detecting the presence of the periodic transmissions on the interfering portion of the frequency band comprises:
the wireless access point sensing the periodic transmissions on the interfering portion of the frequency band.

3. The method of claim 1, wherein detecting the presence of the periodic transmissions on the interfering portion of the frequency band comprises:
receiving one or more reports from one or more of the two or more other devices, wherein the reports comprise information about the periodic transmissions on the interfering portion of the frequency band.

4. The method of claim 3, wherein at least one of the reports comprises information about a received power level of the periodic transmissions on the interfering portion of the frequency band.

5. The method of claim 1, wherein scheduling packet transmission and reception within the wireless local area network such that the second device is scheduled to receive the packet during an occurrence of the one or more future occurrences of the periodic transmissions comprises:
adjusting an air interface frame structure of the wireless local area network such that the second device is scheduled to receive the packet during the occurrence of the one or more future occurrences of the periodic transmissions.

6. The method of claim 5, wherein adjusting the air interface frame structure of the wireless local area network comprises:
changing a periodicity of the air interface frame structure of the wireless local area network.

7. The method of claim 1, wherein scheduling packet transmission and reception within the wireless local area network such that the second device is scheduled to receive the packet during an occurrence of the one or more future occurrences of the periodic transmissions comprises:

adjusting an air interface frame structure of the wireless local area network such that the second device is scheduled to receive the packet during an occurrence of the one or more future occurrences of the periodic transmissions and to transmit another packet during a nonoccurrence of the one or more future occurrences of the periodic transmissions.

8. The method of claim 7, wherein:
the first transmitter operates in a cellular communication system;
the occurrence of the one or more future occurrences of the periodic transmissions is an occurrence of a transmission of the first transmitter; and
the nonoccurrence of the one or more future occurrences of the periodic transmission is an occurrence of a transmission of a second transmitter operating in the cellular communication system.

9. The method of claim 1, comprising:
identifying a third device of the set of devices such that the one or more future occurrences of the periodic transmissions will not interfere with reception of a packet by the third device; and
scheduling packet transmission and reception within the wireless local area network such that the third device is scheduled to receive a packet at the same time that the second device is scheduled to receive a packet.

10. An apparatus for operating a wireless access point device that schedules packet transmission and reception by a set of devices in a wireless local area network, wherein the set of devices includes the access point device and two or more other devices, the apparatus comprising:
circuitry configured to detect the presence of periodic transmissions on an interfering portion of a frequency band from a first transmitter, wherein one or more future occurrences of the periodic transmissions will interfere with reception of a packet by a first device of the set of devices in the wireless local area network;
circuitry configured to identify a second device of the set of devices in the wireless local area network such that the one or more future occurrences of the periodic transmissions will not interfere with reception of a packet on the interfering portion of the frequency band by the second device; and
circuitry configured to schedule packet transmission and reception within the wireless local area network such that the second device is scheduled to receive a packet on the interfering portion of the frequency band during an occurrence of the one or more future occurrences of the periodic transmissions,
wherein:
the first transmitter is a transmitter operating in a cellular communication system; and
the periodic transmissions on the interfering portion of the frequency band are time division duplex transmissions of the first transmitter.

11. The apparatus of claim 10, wherein the circuitry configured to detect the presence of the periodic transmissions on the interfering portion of the frequency band comprises:
circuitry configured to sense the periodic transmissions on the interfering portion of the frequency band.

12. The apparatus of claim 10, wherein detecting the presence of the periodic transmissions on the interfering portion of the frequency band comprises:
circuitry configured to receive one or more reports from one or more of the two or more other devices, wherein the reports comprise information about the periodic transmissions on the interfering portion of the frequency band.

13. The apparatus of claim 12, wherein at least one of the reports comprises information about a received power level of the periodic transmissions on the interfering portion of the frequency band.

14. The apparatus of claim 10, wherein the circuitry configured to schedule packet transmission and reception within the wireless local area network such that the second device is scheduled to receive the packet during an occurrence of the one or more future occurrences of the periodic transmissions comprises:
circuitry configured to adjust an air interface frame structure of the wireless local area network such that the second device is scheduled to receive the packet during the occurrence of the one or more future occurrences of the periodic transmissions.

15. The apparatus of claim 14, wherein circuitry configured to adjust the air interface frame structure of the wireless local area network comprises:
circuitry configured to change a periodicity of the air interface frame structure of the wireless local area network.

16. The apparatus of claim 10, wherein circuitry configured to schedule packet transmission and reception within the wireless local area network such that the second device is scheduled to receive the packet during an occurrence of the one or more future occurrences of the periodic transmissions comprises:
circuitry configured to adjust an air interface frame structure of the wireless local area network such that the second device is scheduled to receive the packet during an occurrence of the one or more future occurrences of the periodic transmissions and to transmit another packet during a nonoccurrence of the one or more future occurrences of the periodic transmissions.

17. The apparatus of claim 16, wherein:
the first transmitter operates in a cellular communication system;
the occurrence of the one or more future occurrences of the periodic transmissions is an occurrence of a transmission of the first transmitter; and
the nonoccurrence of the one or more future occurrences of the periodic transmission is an occurrence of a transmission of a second transmitter operating in the cellular communication system.

18. The apparatus of claim 10, comprising:
circuitry configured to identify a third device of the set of devices such that the one or more future occurrences of the periodic transmissions will not interfere with reception of a packet by the third device; and
circuitry configured to schedule packet transmission and reception within the wireless local area network such that the third device is scheduled to receive a packet at the same time that the second device is scheduled to receive a packet.

* * * * *